United States Patent [19]
Smith

[11] Patent Number: 4,836,386
[45] Date of Patent: Jun. 6, 1989

[54] SORTING SYSTEM

[75] Inventor: Charles L. Smith, Barberton, Ohio

[73] Assignee: The Firestone Tire & Rubber Company, Akron, Ohio

[21] Appl. No.: 521,869

[22] Filed: Aug. 10, 1983

[51] Int. Cl.⁴ .......................... B07C 3/02; B07C 5/36; B65G 25/10; B65G 57/10

[52] U.S. Cl. ................... 209/564; 198/468.1; 198/746; 209/583; 209/651; 209/912; 414/89; 414/749; 414/908

[58] Field of Search ............... 209/563, 564, 565, 583, 209/651-654, 912; 414/89, 136, 749, 1, 98-100, 119, 131, 609, 908, 911; 156/111, 396; 425/38; 198/468.1, 746, 738, 740, 749, 487

[56] References Cited

U.S. PATENT DOCUMENTS

| | | | |
|---|---|---|---|
| Re. 31,294 | 6/1983 | Marosan | 156/396 |
| 2,336,614 | 12/1943 | Jackson | 198/746 X |
| 3,019,883 | 2/1962 | Jones | 209/653 X |
| 3,045,819 | 7/1962 | Heidergott | 209/653 X |
| 3,053,400 | 9/1962 | Erickson et al. | 198/464.2 X |
| 3,159,278 | 12/1964 | Groves | 209/651 X |
| 3,222,716 | 12/1965 | Harris | 425/38 X |
| 3,545,632 | 12/1970 | Cooper | 414/27 |
| 3,602,377 | 2/1969 | Simms | 221/232 X |
| 3,669,248 | 6/1972 | Hargash | 198/749 |
| 3,743,090 | 7/1973 | Brown et al. | 209/583 X |
| 3,895,716 | 7/1975 | Ugo | 209/564 |
| 4,391,769 | 7/1983 | Ichikawa et al. | 264/326 |

FOREIGN PATENT DOCUMENTS 58-130825  8/1983  Japan .

Primary Examiner—Robert B. Reeves
Assistant Examiner—Edward M. Wacyra
Attorney, Agent, or Firm—Ronald Brietkrenz

[57] ABSTRACT

An apparatus for sorting tires and the like. A series of tire transport apparatus are utilized to each selectively draw from a conveyor containing tires of a variety of types and sizes a specific tire type and size which is then transported to a storage apparatus wherein all tires of that particular type and size which have been sorted from the supply conveyor are stored. A series of tire transport apparatus are also utilized to remove the tires from the storage apparatus.

4 Claims, 5 Drawing Sheets

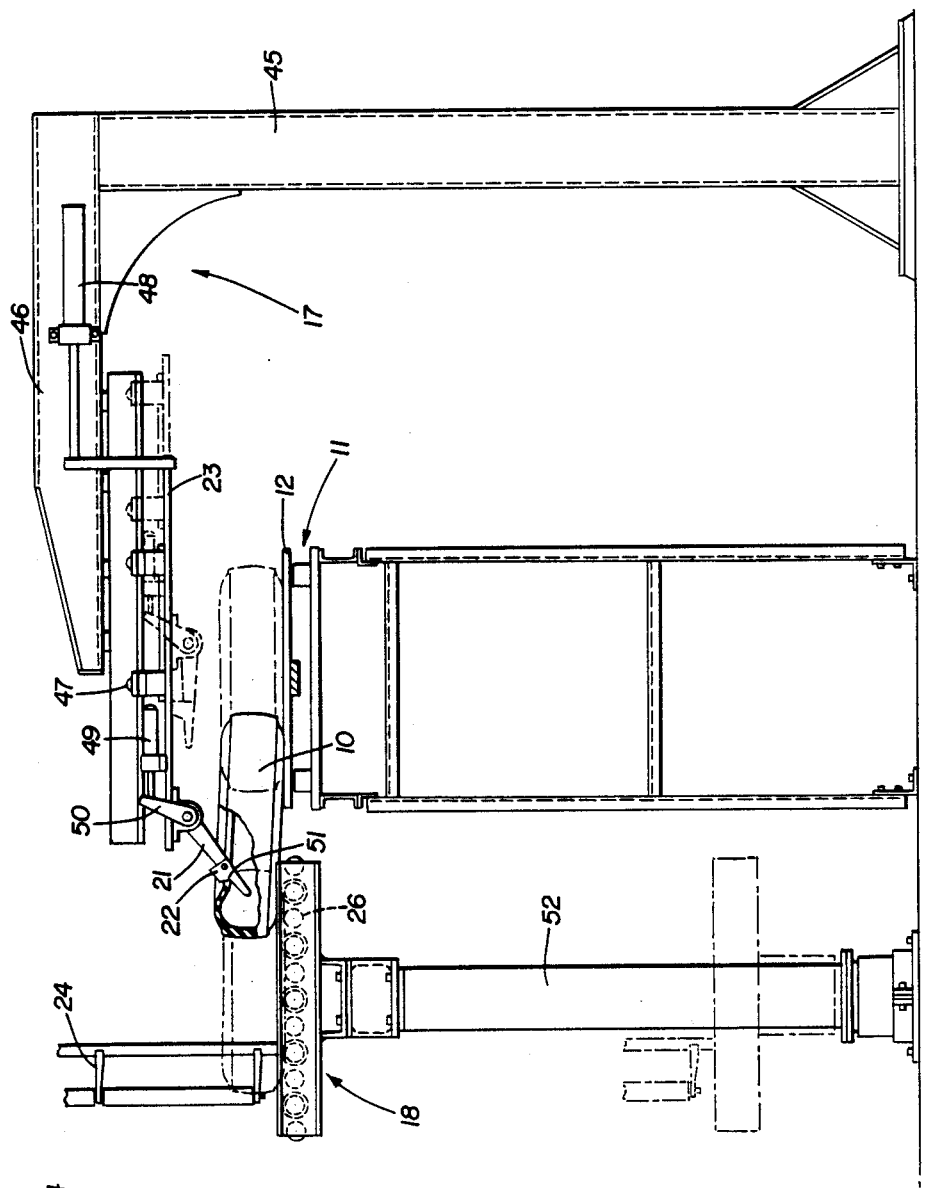
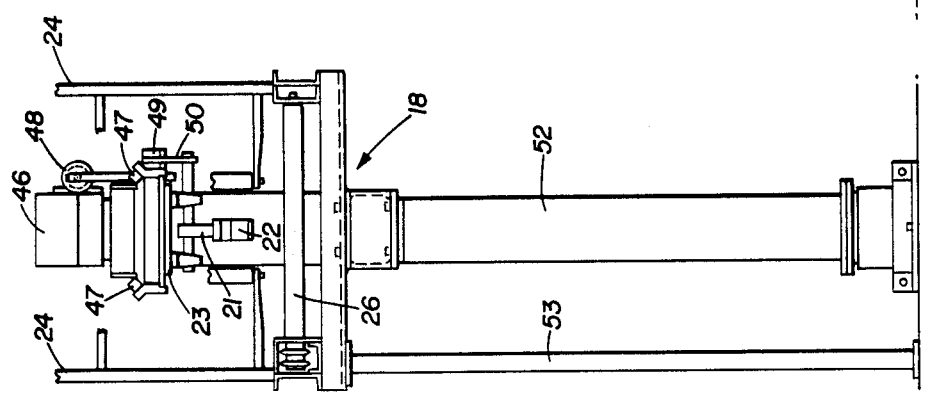
FIG. 5
FIG. 4

SORTING SYSTEM

BACKGROUND OF THE INVENTION

1. Field of the Invention

This invention relates to a means for sorting and more specifically to a means for sorting tires and the like. In particular, the instant invention relates to a means for sorting tires utilizing a pivotally mounted arm adapted to engage the inner bead portion of a tire in order to place the tire in a stack. A plurality of arms may be used in order to sort tires. The stacks of tires are stored in a manner allowing selective access to the tires. The arm device may also be used to remove the tires from the stack.

2. Description of the Prior Art

Material handling means used in the manufacture of tires are known in the art and include devices such as that disclosed in U.S. Pat. No. 4,391,769 to Ichikawa, et al. which discloses an apparatus for loading unvulcanized tires in a tire vulcanizing machine which has a vertically movable loader arm with a contractably expansive paddle at the fore end thereof, an oscillating cylinder cooperative with a movable arm for oscillating the loader arm in a horizontal plane, and stand-by station for temporarily holding unvulcanized tires to be loaded on the vulcanizing machine, the loader arm being adapted to load the unvulcanized tires one after another in a mold on the machine by lifting, oscillating and paddle expanding operations. U.S. Pat. No. Re. 31,294 to Marosan discloses a material handling apparatus utilized in tire recapping operations wherein tires of various sizes are t be adjusted in order to accommodate a wide variety of sizes of tires. In addition, the devices of the prior art are relatively complex involving a substantial expenditure for the fabrication of the devices and further requiring substantial maintenance of the devices and increased downtime associated with these complex mechanical devices.

There is, therefore, a need for a relatively simple means for transporting tires which can accommodate a wide variety of tire sizes and does not necessitate thet be adjusted in order to accommodate a wide variety of sizes of tires. In addition, the devices of the prior art are relatively complex involving a substantial expenditure for the fabrication of the devices and further requiring substantial maintenance of the devices and increased downtime associated with these complex mechanical devices.

There is, therefore, a need for a relatively simple means for transporting tires which can accommodate a wide variety of tire sizes and does not necessitate the accurate registering of the tires with respect to the transport means.

The instant invention solves this problem by providing a pivoting arm means adapted to engage the inner portion of the bead of a tire in order to effect movement of the tire whereby the arm is readily adaptable to transport a wide variety of sizes of tires and further does not require that the tires be accurately registered with respect to the pivotally mounted arm. A plurality of arm means may be used in conjunction with selective access storage means to perform a sorting function of various types and sizes of tires.

SUMMARY OF THE INVENTION

The present invention relates to a means for sorting tires and the like. A series of tire transport means are utilized to each selectively draw from a conveyor containing tires of a variety of types and sizes a specific tire type and size which is then transported to a storage means wherein all tires of that particular type and size which have been sorted from the supply conveyor are stored. A series of tire transport means are also utilized to remove the tires from the storage means.

BRIEF DESCRIPTION OF THE DRAWINGS

FIG. 4 is a front view of the transport means employed by the instant invention showing the details of construction thereof.

FIG. 5 is a left side view of the transport means shown in FIG. 4.

DESCRIPTION OF AN EXEMPLARY EMBODIMENT

Figure 1:
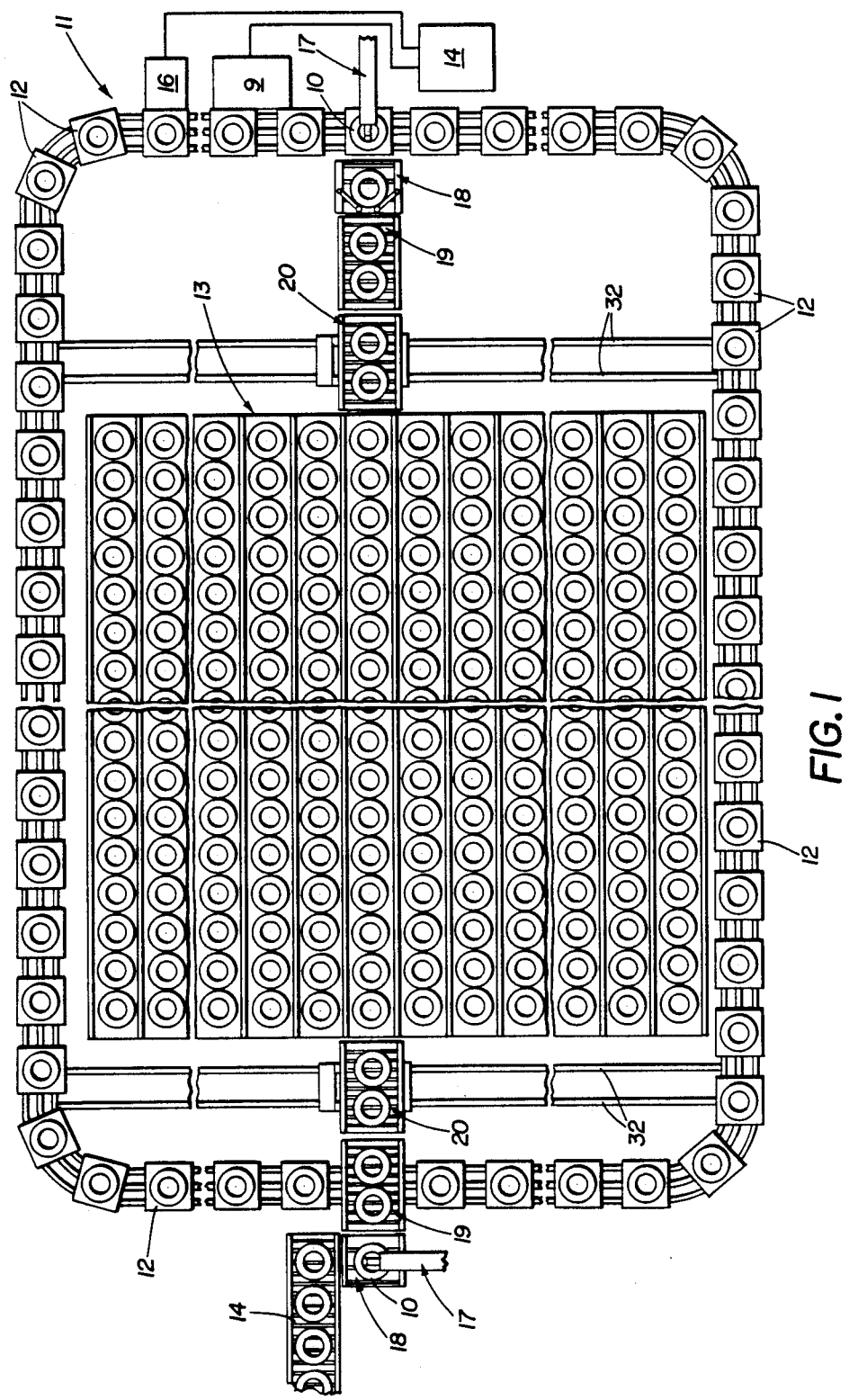
FIG. 1 is a simplified plan view of the sorting system of the instant invention.
Figure 2:
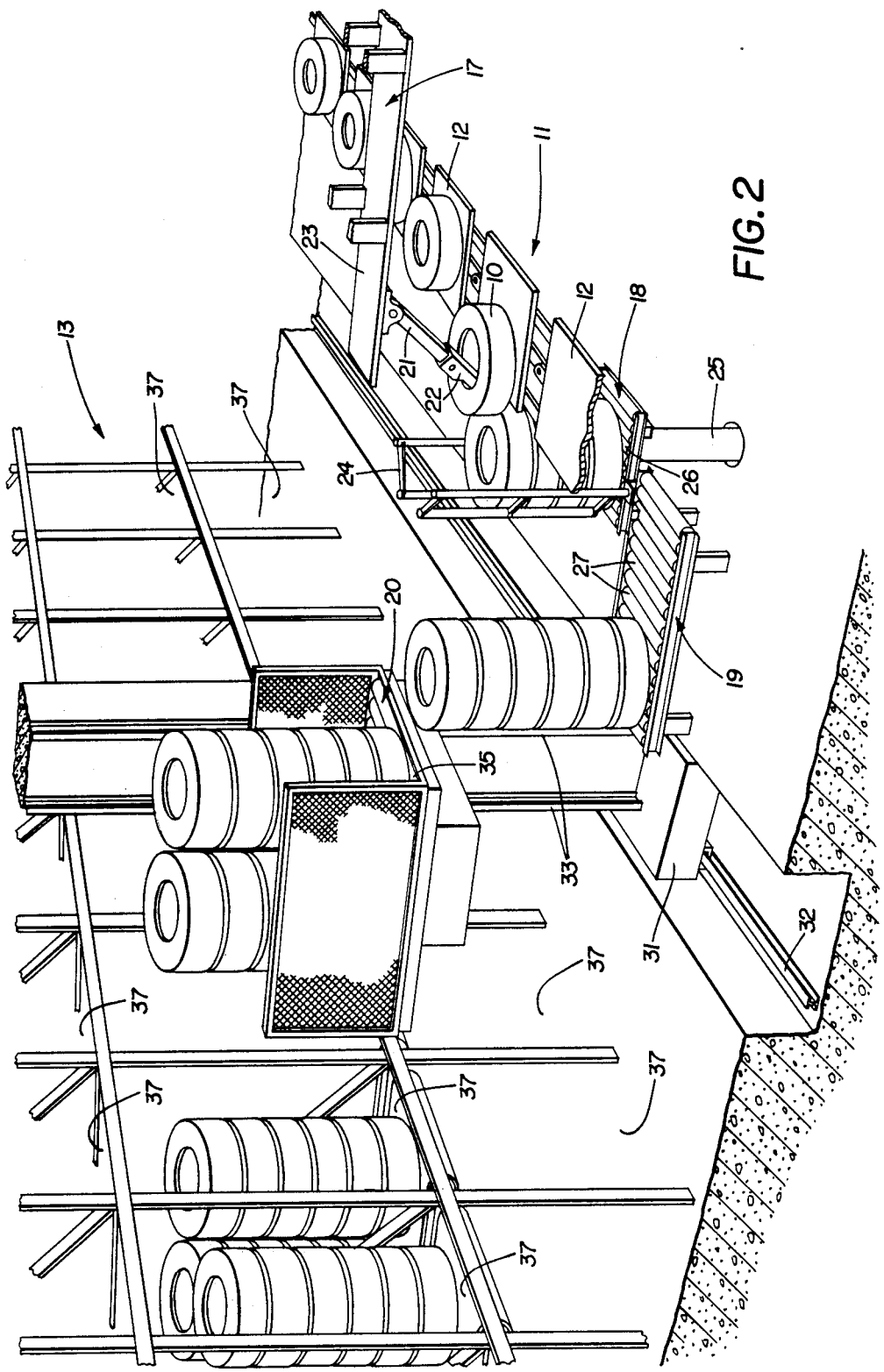
FIG. 2 is a perspective drawing showing the manner in which tires are removed from the supply conveyor and transported to the storage area.
Figure 3:
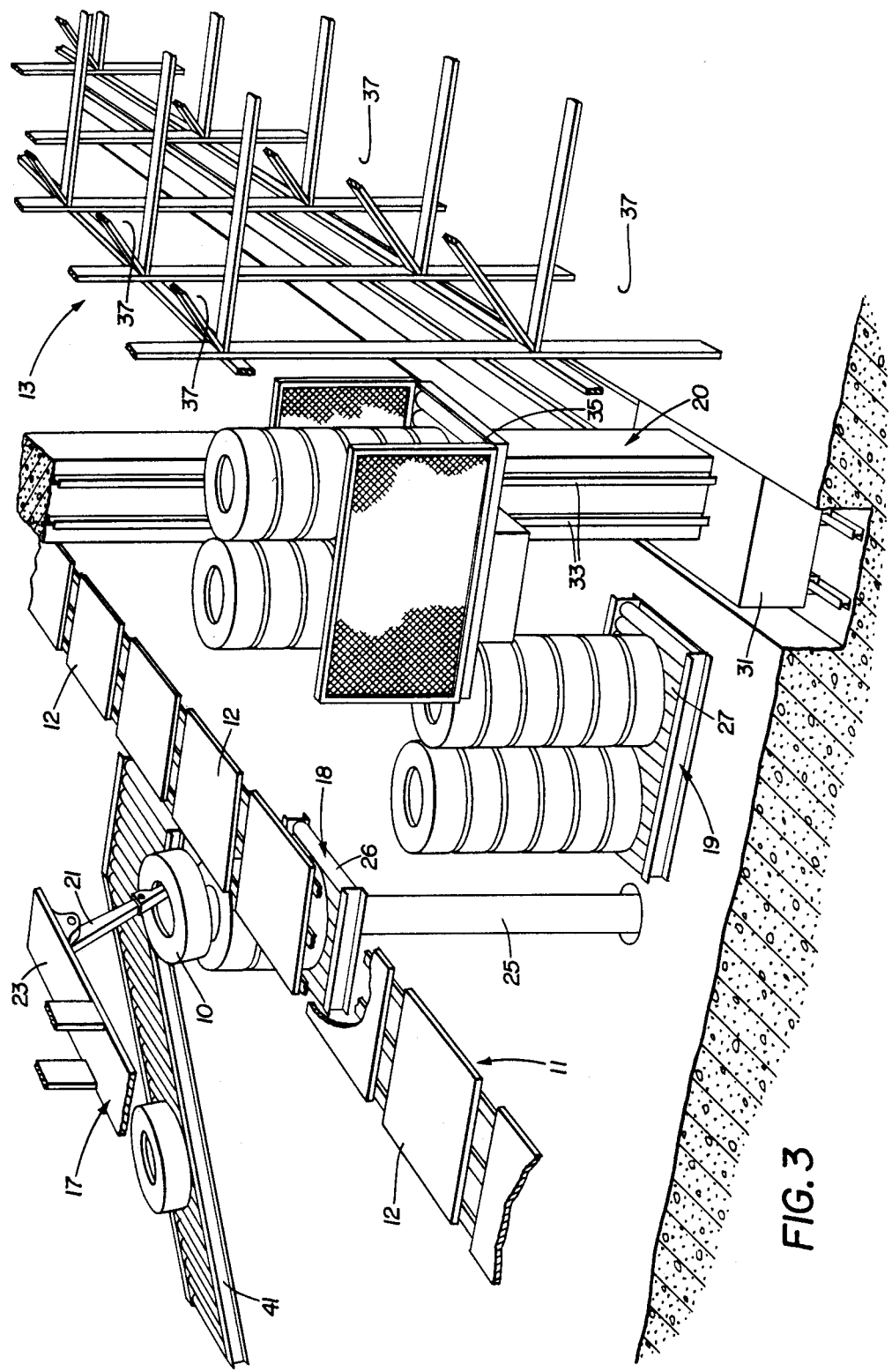
FIG. 3 is a perspective view showing the apparatus employed to remove the tires from the storage area and place same on a conveyor one at a time for further processing.

Referring now to FIGS. 1-3 of the drawings, there is shown a plan view of the sorting system of the instant invention. In a typical tire manufacturing factory, green tires are cured in a tire curing area having a large number of curing presses which are oftentimes producing a wide variety of different sizes and types of tires. The tires are automatically removed from the tire curing presses and transported to a sorting area wherein the tires of a particular type and size are sorted and stored together to facilitate later processing which requires that tires of a particular type and size be processed together. The instant invention employs a series of transport means which are each adapted to remove from the supply conveyor coming from the tire curing area a particular type and size of tire in order to facilitate the storage thereof.

Tires of various types and sizes are provided on the supply conveyor 11 which receives tires of varying types and sizes from the tire curing area. The supply conveyor 11 generally encircles the conveyor storage area 13. The supply conveyor 11 is a continuous conveyor composed of a series of trays 12 adapted to be transported by the conveyor 11. Associated with the supply conveyor 11 is control 14.

The control 14 is operatively associated with the supply conveyor 11 and conveyor drive 19 and has the capability for keeping track of the particular type and size of tire on a particular tray 12 of the supply conveyor 11. The information concerning the particular type and size of tire associated with a particular tray 12 of the supply conveyor 11 may be provided to the control 14 by a wide variety of means. For example, the information concerning the type and size of the tire may be encoded on the tire itself in the form of a bar code which may be read by a sensor 16 proximate to the supply conveyor 11. Alternatively the information concerning the size and type of the tire may be manually inputted into the control 14 by an operator visually inspecting the tires and its associated tray and inputting this information to the control 14. In the exemplary embodiment, a bar code containing information relating to the size and type of the tire is read by a sensor. This information is provided to the control 14 in order to establish a means whereby the control 14 maintains information concerning the contents of each of its trays as more fully discussed below.

Disposed proximate to one side of the conveyor storage area 13 are a series of stacking stations 15. Although only one stacking station is shown in the drawing, the exemplary embodiment employs a series of stacking stations. The stacking stations 15 are adapted to remove from the trays 12 of the supply conveyor 11 the appropriate type and size of tire in order that all tires of a given type and size are removed from the supply conveyor 11 at a particular stacking station 15.

The stacking station 15 is comprised of a transport means 17, a lift station 18, a staging conveyor 19 and a stacking crane 20. The transport means 17 has a pivotally mounted arm member 21 having disposed on the end thereof hand 22. The arm member 21 and its associated hand 22 are laterally movable with respect to the axis of the supply conveyor 11 by means of carriage 23 which may be displaced by means more fully discussed below.

There is thus provided a means for causing the arm member 21 and its associated hand 22 to be pivoted downward from the carriage 23 and moved laterally with resepct to supply conveyor 11 to cause the hand 22 to engage the bead area of the tire 10. Further displacement of the carriage 23 lateral to the supply conveyor 11 cause the tire to move from its position on the tray 12 to the stack of tires on the lift station 18.

It should be noted that as the hand 22 engages the bead area of the tire 10, the angled relation of the hand 22 with respect to the surface of the tray 12 causes a slight lifting of the one side of the tire 10 thereby reducing the frictional engagement of the tire 10 with respect to the tray 12 facilitating transfer of the tire 10 from the tray 12 to the lift station 18.

The lift station 18 is comprised of a hydraulic lift 25 having disposed thereon roller conveyor 26. The roller conveyor 26 may be driven by a motor not shown in the drawings. The height of the lift station 18 is controlled by a central control 14. The top of the roller conveyor 26 is initially substantially even with the top of the tray 12 to facilitate transfer of a tire 10 from the tray 12 to the lift station 18. After a tire has been removed from the tray 12 to the lift station 18 by transport means 17, the hydraulic lift 25 is caused to be lowered by the central control 14 a distance approximately equal to the width of a tire in order that the top plane of the tire on the lift station 18 is approximately even with the tray 12 thereby facilitating the transfer of another tire from the supply conveyor 11 to the lift station 18. Gate mechanism 24 is used to aid in stacking the tires 10 on the lift station 18. The gate mechanism 24 may be swung out of the way in order to transfer the tires 10 from the lift station 18 to the staging conveyor 19. This process is repeated until six (6) tires have been placed on the lift station 18.

After the appropriate number of tires have been placed on the lift station 18 the level of the roller conveyor 26 is caused to be substantially even with the staging conveyor 19. The gate mechanism 24 is opened. The roller conveyor 26 is then driven simultaneously with the staging conveyor 19 in order to effect a transfer of the stack of tires from the lift station 18 to the staging conveyor 19. After the stack has been removed from the lift station 18 the hydraulic lift 25 then causes the roller conveyor 26 to be raised to a position to receive a tire 10 from the tray 12 of the supply conveyor 11.

The staging conveyor 19 is comprised of a series of driven rollers 27. The staging conveyor 19 acts as an intermediate transfer mechanism between the lift station 18 and the stacking crane 20. After two stacks of tires have been transferred from the lift station 18 to the staging conveyor 19 the stacking crane 20 is positioned proximate to the staging conveyor 19 in order that the two stacks of tires may be transferred from the staging conveyor 19 to the stacking crane 20.

The stacking crane 20 is comprised of a carriage 31 adapted to traverse rails 32 which are disposed parallel to the ends of the conveyor storage area 13. Disposed on the carriage 31 are lift rails 33 upon which are disposed lift 34. Mounted on the lift 34 is roller conveyor 35 which is comprised of a series of rolls which are driven by a motor not shown. It may be appreciated by one skilled in the art that there is thus provided a means for transferring stacks of tires from the staging conveyor 19 via the stacking crane 20 to the conveyor storage area 13 by movement of the carriage 31 along its associated rails 32 and vertical movement of the lift 34 along the lift rails 33 thereby providing a means for transferring tires disposed on the roller conveyor 35 to the conveyor storage area 13.

The conveyor storage area 13 is comprised of a plurality of conveyors which are adapted to receive from the stacking crane 20 stacks of tires. In the exemplary embodiment, the conveyor storage area 13 is comprised of a series of conveyor cells 37. Each conveyor cell includes a continuous belt conveyor 38 which is adapted to receive stacks of tires approximately 6 tires high. During the transfer of tires from the stacking crane 20 to a particular conveyor cell 37 the roller conveyor 35 of the stacking crane 20 is driven simultaneously with a driving of the conveyor belt 38 of the conveyor cell 37 thereby effecting a transfer of the stacks of tires from the stacking crane 20 to the conveyor cell 37. In the exemplary embodiment there are approximately 70 rows of conveyor cells with each row being three cells high to provide approximately 210 conveyor cells in which stacks of tires may be stored. The conveyor cells are each approximately 150 ft. long thereby affording substantial storage area for the stacks of tires.

There is thus provided a means for sorting and transporting tires received from a supply conveyor 11 wherein the type and size of tire 10 associated with each of the trays 12 of the supply conveyor 11 is provided to a central control 14 which in turn controls the plurality of transport means 17 to cause tires of a selected type and size to be removed from the tray 12 to a lift station 18 in order to place the tire in a stack approximately six (6) tires high. The stack of the same type and size tires are then transported from the lift station 18 to a staging conveyor 19 where two stacks of like type and size tires are accumulated before being transported by the stacking crane 20 to a selected conveyor cell 37 in order that tires of a selected type and size may be readily retrieved from the conveyor storage area 13.

Referring now to FIG. 3 of the drawings there is disclosed the apparatus utilized by the instant invention to retrieve stacks of tires from the conveyor storage area 13 and provide them to a feed conveyor 41 for further processing whereby all tires provided to a particular feed conveyor 41 are of a particular type and size.

The stacking crane 20 is employed to retrieve two stacks of tires of like type and size from a particular conveyor cell 37 and provide the two stacks of tires to staging conveyor 19. The stacks of tires are transferred from the staging conveyor 19 to the lift station 18. The lift station 18 progressively raises allowing the transport means 17 to remove the tires 10 from the stack to the feed conveyor 41 thereby providing a means for moving the tires from stacks contained within the conveyor storage area 13 to a feed conveyor 41 allowing further processing of the tires and providing tires of the same type and size to a particular feed conveyor 41.

FIGS. 4 and 5 disclose further details of the transport means 17. The transport means 17 is comprised of a base 45 having affixed thereto cantilever member 46 which is adapted to be disposed over the position from which the tires 10 are removed. Associated with the cantilever member 46 is carriage 23 which is adapted to traverse the cantilever member 46 by means of rollers 47 rotatably affixed to the carriage 23 and engaging the cantilever member 46 thereby allowing movement along the cantilever member 46. The movement of the carriage 23 along the cantilever member 46 is effected by means of pneumatic cylinder 48 which may be selectively actuated to position the carriage 23 along the cantilever member 46.

Affixed to the carriage 23 is actuating cylinder 49 which is adapted to rotate lever arm 50 which in turn is fixedly attached to arm member 21. It may thus be appreciated that actuation of the actuating cylinder 49 will cause a rotation of the lever arm 50 and hence a rotation of the arm member 21 all as more fully described below. Hand 22 is fixedly attached to the end of the arm member 21. The axis of the hand 22 is generally coincident with that of the arm member 21. The end of the hand 22 is generally rounded. The portion of the hand 22 that is affixed to the arm member 21 has an enlarged portion forming bead engaging area 51 adapted to engage the bead area of the tire as it is moved by the transport means 17.

In operation the carriage 23 is moved to place the hand 22 at approximately the center of the tire to be moved. The actuating cylinder 49 is then caused to lower the arm member 21 toward the tire 10 until the end of the hand 22 is below a plane containing the upper bead of the tire 10. The carriage 23 is then caused to be moved towards the final position of the tire to be moved. It should be noted that as the carriage 23 is moved the tire will be caused to climb the hand 22 due to the angled relationship of the hand 22 with respect to the support surface of the tire 10. This lifting action will reduce the frictional engagement of the tire 10 with respect to its supporting surface thereby facilitating transfer of the tire 10 from the initial position to the final position of the tire 10.

Further details of construction of the lift station 18 are also disclosed in FIG. 4 of the drawings. Specifically the lift station 18 includes ram 52 which is generally disposed in its retracted position in the floor and may be extended upwards through a hydraulic system. Stabilizer mechanism 53 is utilized to extend with the ram 52 and prevent rotation when the ram is in an extended position.

Figure 6:
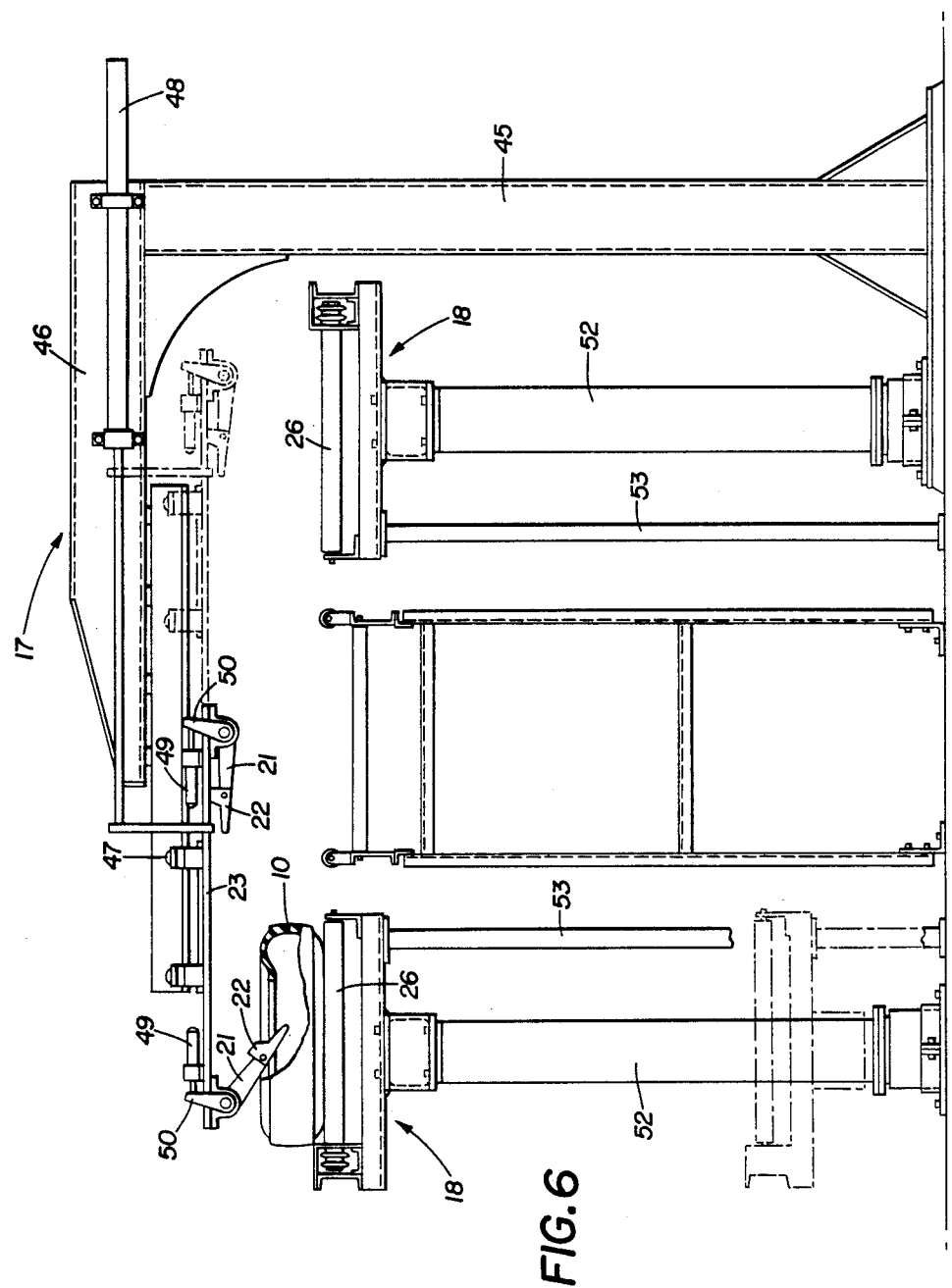
FIG. 6 is an alternative embodiment of the transport means.

FIG. 6 of the drawings discloses an alternative embodiment of the instant invention employing an apparatus utilizing two arms and associated hand mechanisms associated with a single carriage which is adapted to remove tires from two lift stations either singly or at the same time.

It will be apparent to those skilled in the art that various modifications and additions may be made in the instant invention without departing from the essential features thereof which are intended to be defined and secured by the appended claims.

What is claimed is:

1. An apparatus for sorting substantially horizontally disposed tires having vertically spaced upper and lower annular beads from a conveying means having tires of various types disposed on said conveying means comprising:
   (a) identifying means adapted to determine the types of tires on said conveying means; and
   (b) generally horizontally moveable transport means responsive to said identifying means for removing a tire in a generally horizontally sliding movement from said conveying means wherein said transport means includes a pivotally mounted arm member which engages an area of the upper bead of said tire and causes a slight lifting of one side only of said tire beneath the engaged upper bead area to enable lateral sliding movement of said tire from the conveying means with a reduction of frictional resistance due to said lifting of said one side without completely lifting the tire from the conveying means when displaced by said transport means.

2. The apparatus of claim 1 further comprising:
   (a) variable height support means adapted to receive tires from said transport means.

3. An apparatus for moving a tire from a substantially horizontally disposed first supporting surface, said tire having vertically spaced upper and lower annular beads, comprising:
   (a) tire engaging means having an angled surface engageable with an area of the upper bead of the tire adjacent one sidewall to lift a portion of the tire located generally between the engaged bead area from the supporting surface to enable lateral displacement of said tire from said supporting surface with a reduction of frictional resistance due to said lifted tire portion; and
   (b) transport means associated with said tire engaging means and moveable in a generally horizontal direction wherein said angled surface engages the upper bead area of said tire to lift said portion of the tire from the supporting surface and to displace said tire from said supporting surface to an adjacent substantially horizontally disposed second supporting surface.

4. The apparatus of claim 3 further comprising:
   (a) displacement means associated with said tire engaging means adapted to displace said tire engaging means.

* * * * *

UNITED STATES PATENT AND TRADEMARK OFFICE
CERTIFICATE OF CORRECTION

PATENT NO. : 4,836,386
DATED : June 6, 1989
INVENTOR(S) : Charles L. Smith

It is certified that error appears in the above-identified patent and that said Letters Patent is hereby corrected as shown below:

Column 1, line 33

After are, delete "t" and insert -- automatically fed to a cluster of recapping machines. The tire is automatically centered for engagement by the gripping arms of a transfer apparatus which transfers the tire from the feed conveyor to the proper recapping machine.

The devices of the prior art are generally adapted to completely engage either an inner or outer surface of the tire. Accordingly, in order to effect this grasping, the tire must be very accurately registered with respect to the transport means and the transport means must --

Column 1

Delete lines 40 through 49

Column 2, line 55

"19" should be -- 9 --

Signed and Sealed this

Thirteenth Day of March, 1990

Attest:

JEFFREY M. SAMUELS

Attesting Officer     Acting Commissioner of Patents and Trademarks